United States Patent
Yang et al.

(10) Patent No.: US 10,873,097 B2
(45) Date of Patent: Dec. 22, 2020

(54) ELECTRODE FOR FUEL CELL, MEMBRANE ELECTRODE COMPLEX BODY FOR FUEL CELL, AND FUEL CELL

(71) Applicant: KABUSHIKI KAISHA TOSHIBA, Tokyo (JP)

(72) Inventors: Tianyi Yang, Kanagawa (JP); Wu Mei, Kanagawa (JP); Taishi Fukazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 582 days.

(21) Appl. No.: 15/052,038

(22) Filed: Feb. 24, 2016

(65) Prior Publication Data
US 2016/0285116 A1 Sep. 29, 2016

(30) Foreign Application Priority Data
Mar. 25, 2015 (JP) .................................. 2015-062623

(51) Int. Cl.
*H01M 4/86* (2006.01)
*H01M 8/04291* (2016.01)
(Continued)

(52) U.S. Cl.
CPC ..... *H01M 8/04291* (2013.01); *H01M 4/8605* (2013.01); *H01M 4/8663* (2013.01);
(Continued)

(58) Field of Classification Search
CPC ............... H01M 8/023; H01M 8/0245; H01M 4/86–4/96; H01M 8/04291;
(Continued)

(56) References Cited

U.S. PATENT DOCUMENTS 5,882,810 A * 3/1999 Mussell ............ H01M 4/8642
204/282
2010/0047652 A1* 2/2010 Song .................. H01M 4/8605
429/524
(Continued)

FOREIGN PATENT DOCUMENTS

JP 11-45733 2/1999
JP 2007-317435 A 12/2007
(Continued)

OTHER PUBLICATIONS

Tanuma, T., et al., "Innovative Hydrophilic Microporous Layers for Cathode Gas Diffusion Media", Journal of The Electrochemical Society, 157, No. 12, pp. B1809-B1813, (2010).
(Continued)

*Primary Examiner* — Milton I Cano
*Assistant Examiner* — Philip A. Stuckey
(74) *Attorney, Agent, or Firm* — Finnegan, Henderson, Farabow, Garrett & Dunner, L.L.P.

(57) ABSTRACT

An electrode for a fuel cell according to an embodiment of an embodiment includes: a catalyst layer having a noble metal catalyst unit that has a porous structure or a layer-by-layer structure including void layers and a hydrophilic material; a porous water management layer arranged adjacent to the catalyst layer and including a hydrophilic material and a conductive material; and a gas diffusion layer arranged adjacent to the porous water management layer, where a size of the noble metal catalyst unit is equal to or more than 0.05 μm and equal to or less than 2 μm, the porosity of the porous water management layer is equal to or more than 30 vol % and equal to or less than 85 vol %, and the hydrophilicity thereof is equal to or more than 0.05 and equal to or less than 1.

22 Claims, 4 Drawing Sheets

(51) Int. Cl.
  *H01M 8/1004* (2016.01)
  *H01M 4/90* (2006.01)
  *H01M 8/1018* (2016.01)

(52) U.S. Cl.
  CPC ....... *H01M 4/9041* (2013.01); *H01M 8/1004* (2013.01); *H01M 2008/1095* (2013.01); *H01M 2250/20* (2013.01); *Y02E 60/50* (2013.01); *Y02T 90/40* (2013.01)

(58) Field of Classification Search
  CPC ............. H01M 4/8663; H01M 4/9041; H01M 8/1004; H01M 4/8605; H01M 2008/1095; H01M 2250/20; Y02E 60/50; Y02T 90/40
  See application file for complete search history.

(56) References Cited

U.S. PATENT DOCUMENTS

| | | | |
|---|---|---|---|
| 2010/0081025 A1 | 4/2010 | Kongkanand et al. | |
| 2010/0261089 A1* | 10/2010 | Morioka | H01M 4/8605 429/481 |
| 2012/0094215 A1* | 4/2012 | Satou | H01M 4/8605 429/516 |
| 2012/0100461 A1* | 4/2012 | Iden | H01M 4/8605 429/516 |
| 2013/0078549 A1 | 3/2013 | Fukazawa et al. | |
| 2013/0252132 A1 | 9/2013 | Mei et al. | |
| 2015/0044593 A1 | 2/2015 | Tanuma et al. | |

FOREIGN PATENT DOCUMENTS

| | | |
|---|---|---|
| JP | 2009-80968 | 4/2009 |
| JP | 2013-69551 | 4/2013 |
| JP | 2013-73695 A | 4/2013 |
| JP | 2013-226537 A | 11/2013 |
| JP | 2014-225424 A | 12/2014 |

OTHER PUBLICATIONS

Kongkanand et al., "Improving Operational Robustness of NSTF Electrodes in PEM Fuel Cells," Journal of The Electrochemical Society, 158 (8) F405-F411 (2012).

* cited by examiner

ELECTRODE FOR FUEL CELL, MEMBRANE ELECTRODE COMPLEX BODY FOR FUEL CELL, AND FUEL CELL

CROSS-REFERENCE TO RELATED APPLICATION

This application is based upon and claims the benefit of priority from the prior Japanese Patent Application No. 2015-062623, filed on Mar. 25, 2015, the entire contents of which are incorporated herein by reference.

FIELD

Embodiments of embodiments relate to an electrode for a fuel cell, a membrane electrode assembly for a fuel cell, and a fuel cell.

BACKGROUND

A carbon-supported catalyst of a carbon black carrier supporting a noble metal catalyst is generally used for polymer electrolyte membrane fuel cell (PEFC). In a case where it is used in a fuel cell vehicle (FCV), the carbon carrier included in the catalyst can be corroded due to activation and stop of the fuel cell, and accordingly, this accelerates degradation of the noble metal catalyst and the membrane electrode assembly (MEA) as well. Therefore, in order to greatly reduce the amount of the noble metal catalyst to be used in PEFC, it is essential to develop a noble metal catalyst that is highly durable and has a large reaction area. A carbonless catalyst formed by sputtering or evaporation can avoid the problem of degradation caused by corrosion of the carbon carrier.

In the past, e.g., a structure having a water-repellent microporous layer (MPL) formed by applying a mixed ink of a fluorine resin and carbon black particles onto a conductive porous sheet which has been made by applying water-repelling treatment on carbon paper or a carbon cloth with a fluorine resin has been used as a gas diffusion layer (GDL) of a PEFC.

However, an MPL having water-repellent property pushes some of the generated water back to the electrode side, and in a case of a carbonless catalyst having much thinner thickness, usually 1%-10% of the thickness of a carbon supported catalyst, the power generation property of a fuel cell is likely to be reduced due to an operating environment where flooding of water is likely to occur, i.e., highly humid electric generation environment, therefore it is necessary to improve the robustness of the catalyst.

In order to prevent formation of a water film on the surface of a generated water adjustment layer (water-repellent MPL) in a fuel cell, Patent Literature 1 discloses a fuel cell where an intermediate layer is provided between a generated water adjustment layer and a reaction layer at an oxidizing pole (cathode) of the fuel cell, and this intermediate layer has a water-repellent agent and a hydrophilic agent, and a gradient is given in the water-repellent agent concentration in such a manner that the concentration of the water-repellent property material decreases from the generated water adjustment layer side to the reaction layer.

However, in the intermediate layer formed as described in Patent Literature 1, it is necessary to apply, to the gas diffusion layer, an ink, a paste, or the like made by mixing the carbon powder and the material having the hydrophilic property and the water-repellent property, and the carbon powder, the hydrophilic agent, and the water-repellent agent may soak into the gas diffusion layer, which is likely to reduce the gas diffusion.

DETAILED DESCRIPTION

An electrode for a fuel cell according to an embodiment of an embodiment includes: a catalyst layer of a porous structure including voids and a noble metal catalyst and a hydrophilic material; a porous water management layer arranged adjacent to the catalyst layer including a hydrophilic material and a electrical conductive material; and a gas diffusion layer arranged adjacent to the porous water management layer, where a size of the noble metal catalyst unit is equal to or more than 0.05 μm and equal to or less than 2 μm, the porosity of the porous water management layer is equal to or more than 30 vol % and equal to or less than 85 vol %, and the hydrophilicity thereof is equal to or more than 0.05 and equal to or less than 1.

In this case, the hydrophilicity means the weight of the hydrophilic agent introduced per unit area size divided by the weight of the conductive material in the porous water management layer per unit area size.

In a membrane electrode assembly for a fuel cell and fuel cell according to an embodiment of an embodiment, the electrode for the fuel cell explained above is used as a part of the configuration thereof.

Hereinafter, embodiments of embodiments will be described in details with reference to drawings.

First Embodiment

Figure 1:
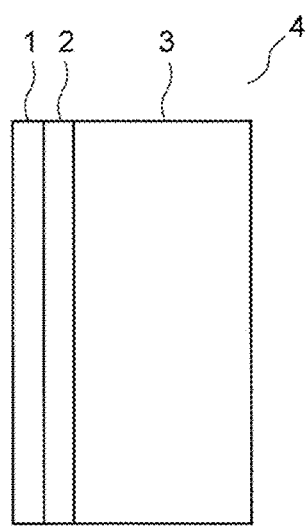
FIG. 1 is a cross sectional view schematically illustrating an electrode according to a first embodiment of an embodiment.

FIG. 1 is a figure schematically illustrating a structure of an electrode according to an embodiment of an embodiment. As illustrated in FIG. 1, an electrode 4 according to the embodiment of the embodiment is constituted by a stacked structure. More specifically, the electrode 4 is made of a stacked structure that is obtained by stacking, in order, a catalyst layer 1 constituted by noble metal catalyst units that have a porous structure or a layer-by-layer structure including void layers and a hydrophilic material, a porous water management layer 2 having a hydrophilic material and a conductive material, and a gas diffusion layer 3.

According to the embodiment of the electrode, the robustness of the fuel cell using the catalyst layer 1 against the operation temperature and the humidity can be greatly improved. In general, in a fuel cell using the catalyst layer 1, the catalyst itself serves as not only the catalyst but also the structural body, and therefore, it is not necessary to have a carrier like a carbon-supported catalyst. For this reason, the catalyst layer 1 is very thin, and when the fuel cell is operated in a highly humid environment, and in particular, during operation with a high electric current density, the generated water is more difficult to be discharged, and accordingly, the generated water is accumulated in the cell. Therefore, this makes it difficult for oxygen (air) transportation, and causes an output reduction phenomenon called flooding. In this case, the robustness means an occurrence of output fluctuation due to flooding when the humidity of the oxidized gas provided to the fuel cell is increased. When the electrode according to the present embodiment is employed, this fluctuation can be reduced, and the fuel cell can operate stably.

Figure 2:
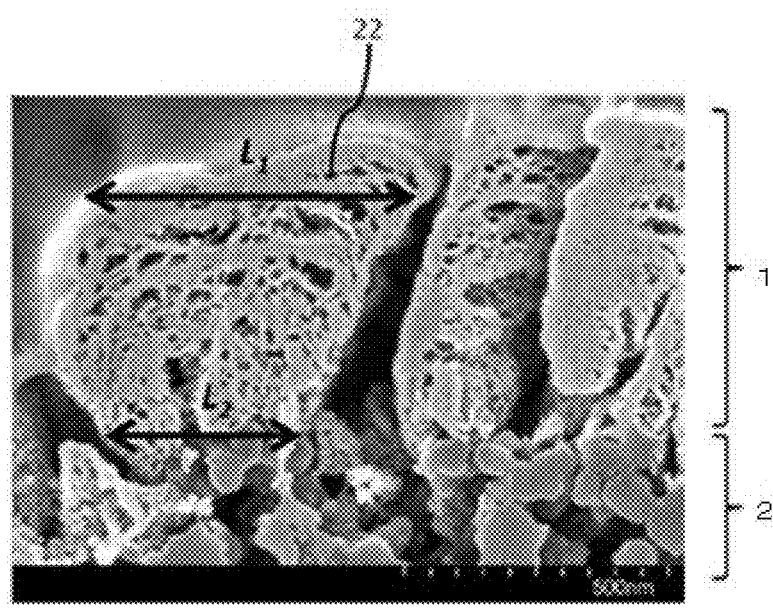
FIG. 2 is a cross sectional view illustrating a noble metal catalyst unit according to the first embodiment of the embodiment.

FIG. 2 is a figure illustrating an image obtained by observing a part of a cross section of the catalyst layer 1 according to the embodiment by using a scanning electron microscope (SEM). As illustrated in the image, the catalyst layer 1 is carried on the porous water management layer 2.

In the electrode according to the present embodiment, the catalyst layer 1 includes noble metal catalyst units 22 that has a porous structure or a layer-by-layer structure including void layers. As illustrated in FIG. 2, the size of the noble metal catalyst unit 22 is defined as an average value of a length L1 of a long side of the noble metal catalyst unit 22 which is in the parallel direction to the porous water management layer 2 and a length L2 of a short side thereof. The size of the noble metal catalyst unit 22 is preferably 0.05 μm to 2 μm. In order to smoothly supply gas and make substance movement of product discharge, the size of the noble metal catalyst unit 22 is, more preferably, 0.1 μm to 1 μm. Then, the overall average thickness of the catalyst layer 1 is preferably 0.05 μm to 3 μm. The average diameter of the holes of the noble metal catalyst unit having the porous structure is 3 nm to 400 nm, and in average, the ratio of the long side and the short side is preferably equal to or more than 1:1 and equal to or less than 10:1. The noble metal catalyst unit having the layer-by-layer structure including void layers has such a structure in which multiple sheet-like unit noble metal catalysts having a thickness of 2 nm to 30 nm are stacked. The noble metal catalyst unit has a layer-like structure having a void layer provided between sheet-like unit catalysts. The overall thickness of the catalyst layer is 0.05 μm to 3 μm, and the thickness of the one catalyst layer is 4 nm to 30 nm. A noble metal catalyst having hydrophilic property may be formed by applying a hydrophilic material to the surface of this noble metal catalyst. The hydrophilic material is preferably a polymer having hydrophilic property, and further, the hydrophilic material is, more preferably, ionomer having proton conduction property. By applying the hydrophilic property ionomer to the noble metal surface, the proton conduction of the noble metal catalyst or the adhesiveness between the catalyst and the polymer electrolyte membrane can be improved.

In the electrode according to the present embodiment, the porous water management layer 2 is a hydrophilic layer formed by incorporating a hydrophilic material into a porous layer formed by applying paste or ink including carbon fine particles and the like having electric conductivity. The hydrophilic material preferably a polymer having hydrophilic property, and further, the hydrophilic material is, more preferably, ionomer having proton conduction property.

In the degree of hydrophilicity, the hydrophilicity in the method for indicating the hydrophilicity explained below is preferably equal to or more than 0.05 in order to achieve the effect of the embodiment.

In this case, the hydrophilicity is defined as follows.

(hydrophilicity)=(weight of hydrophilic agent introduced per unit area size)/(weight of conductive material in the porous water management layer per unit area size)

In a case where too much hydrophilic agent is introduced, much hydrophilic agent enters the void portion of the catalyst layer and the porous water management layer to cover the catalyst layer and the like, which obstructs diffusion of the oxygen and the contact between oxygen and the catalyst, and the like. For this reason, when the catalyst layer and the porous water management layer are made hydrophilic, the upper limit of the hydrophilicity is preferably 1.

The amount of application of a pore-forming organic material for the porous water management layer 2 is preferably in a range of equal to or more than 30 vol % and equal to or less than 85 vol % on the basis of the porosity of the entire porous water management layer 2.

In a case where the porosity is less than 30 vol %, the gas diffusion property is low, and the water cannot be efficiently discharged. In contrast, when the porosity is more than 85 vol %, the mechanical strength of the porous water management layer 2 is low, and the structural retention property of the water management layer is likely to be reduced. In this case, the porosity indicates, in a percentage, a ratio of void space in the porous water management layer 2 per unit volume size. The porosity can be derived from an apparent volume V (m$^3$) of the porous water management layer, a weight m (kg) of the porous water management layer, and a density ρ (kg/m$^3$) of the structural material in the porous water management layer. More specifically, (porosity)=1−m/ρ×V The apparent volume V (m$^3$) of the porous water management layer and the weight m (kg) of the porous water management layer can be derived by using a Vernier caliper and a weight scale, respectively. The density ρ (kg/m$^3$) of the structural material of the porous water management layer can be derived from composition analysis and the like of the material.

The porous water management layer 2 formed as described above is preferably such that the thickness of the porous water management layer is equal to or more than 1 μm and equal to or less than 10 μm in order to maintain a high level of water discharge property. In a case where the thickness of the porous water management layer 2 is less than 1 μm, the membrane thickness control is difficult in the production step. If the thickness of the porous water management layer 2 is equal to or more than 1 μm, the pressure given by the unevenness of the gas diffusion layer to the electrolyte membrane can be alleviated when the electrolyte membrane, the catalyst layer, the porous water management layer, and the gas diffusion layer are stacked and hot pressed. When the hole diameter of the porous layer is compared with the hole diameter of the gas diffusion layer, the hole diameter of the porous layer is extremely smaller than the hole diameter of the gas diffusion layer, and the porous layer has a higher level of resistivity against gas diffusion. When the thickness of the porous layer is reduced, the oxygen diffusion property is improved, and the water can be easily discharged from the supplied gas. Since the porous water management layer is hydrophilic, the water holding ability is high, and when the thickness is more than 10 μm, the water discharge ability is likely to be reduced, and therefore, flooding may occur.

The noble metal catalyst layer 1 having a noble metal catalyst unit 22 that has a porous structure or a layer-by-layer structure including void layers as described above can be obtained by using deposition means such as sputtering or evaporation to deposit the noble metal catalyst layer 1 on the surface of the porous water management layer 2.

In the electrode according to the embodiment, the gas diffusion layer is a porous carbon base material. Carbon felt, carbon paper, and carbon cloth can be preferably used. In order to ensure efficient discharge of the water, the gas diffusion layer sandwiched between the hydrophilic porous water management layer and the separator preferably includes a water-repellent agent. The water-repellent agent preferably uses fluorine resins such as polytetrafluoroethylene (PTFE), polyvinylidene fluoride (PVDF), tetrafluoroethylene-hexafluoropropylene copolymer (FEP), tetrafluoroethylene-perfluoroalkyl vinyl ether copolymer (PFA) which are chemically stable and have a high level of water-repellent property.

The degree of water-repellency of the gas diffusion layer is defined as follows.

The degree of water-repellency=(weight of introduced water-repellent agent per unit area size)/(weight of gas diffusion layer base material per unit area size)

In order to achieve the water management function in the gas diffusion layer, the degree of water-repellency is preferably more than zero and preferably equal to or less than 0.6, and from the perspective of ensuring a high gas diffusion property and a low electric resistance, the degree of water-repellency is preferably more than zero and preferably equal to or less than 0.4.

Subsequently, steps for forming the electrode according to the embodiment of the embodiment will be explained with reference to drawings.

FIG. 3A, 3B, 3C, 3D, 3E is a figure schematically illustrating the steps for forming the electrode according to the embodiment of the embodiment.

The method for producing the electrode according to the embodiment includes a step of forming the porous water management layer 2, of which thickness is, for example, equal to or more than 1 μm and equal to or less than 10 μm, on the substrate 5 having acid resisting and heat resisting property, a step of stacking the catalyst layer 1 on the porous water management layer 2 serving as a base substance, in accordance with a method for producing a catalyst having a noble metal catalyst unit 22 that has a porous structure or a layer-by-layer structure including void layers disclosed in Patent Literature 1, making hydrophilicity with a material having a hydrophilic property, and a step of transferring the catalyst layer 1 having the hydrophilic property and the porous water management layer 2 onto the polymer electrolyte membrane 6 having a proton conduction property, separating the substrate 5 from the porous hydrophilic layer 2, stacking the gas diffusion layer 3, and obtaining the electrode 4 including the catalyst layer 1 having a noble metal catalyst unit 22 that has a porous structure or a layer-by-layer structure including void layers and a hydrophilic material, the porous hydrophilic layer 2, and the gas diffusion layer 3.

The details of each step will be hereinafter explained in order.

First, in the step of forming the porous water management layer 2 according to the present embodiment, a porous membrane is formed by applying, onto the substrate 5, a carbon paste, ink, and the like obtained by dispersing, into a solvent, a mixture of a carbon fine particle carrying a noble metal catalyst or conductive carbon fine particles made of carbon black, graphite, carbon fiber, carbon nanotube, and the like, and a viscous pore-forming organic material made of glycerin, diglycerol, ethylene glycol, propylene glycol, butylene glycol, polyethylene glycol, and the like, and further, a hydrophilic layer is formed by introducing a hydrophilic material. For example, water, methanol, ethanol, 1-propanol, 2-propanol, and the like can be used as a solvent. In this case, when the carbon paste, the ink, and the like are applied, the thickness of the applied film is checked, and the carbon paste, the ink, and the like are applied until a desired thickness is attained. The substrate 5 may made of a base substance that has a superior acid resistance property and heat resistance property. For example, a polymer film such as Kapton™, PTFE, and the like, and other base substances such as acid resisting metal, quartz, silica, and the like. In order to improve the bonding force of the interface between the substrate 5 and the porous water management layer 2, an operation for increasing the surface roughness such as a blast treatment of the surface of the substrate 5 may be performed (FIG. 3 A.

The porous water management layer explained above can be produced by an application method for applying the ink and the paste, which is obtained by dispersing the mixture of the conductive carbon particles and the pore-forming organic materials in the solvent, onto the substrate 5 and capable of controlling the thickness thereof. The surface of the substrate 5 is flat, and therefore, even if the porous water management layer 2 made according to this method is thin, a continuous porous layer can be formed. The surface of the porous water management 2 is extremely flat, and three is an positive effect in that, even in a case where the press pressure of the hot press is small, the contact between the porous water management layer 2 and the catalyst layer 1 can be maintained in a preferable state.

Subsequently, as shown in FIG. 3 B, the catalyst layer 1 having a noble metal catalyst unit 22 that has a porous structure or a layer-by-layer structure including void layers is formed on the surface of the porous water management layer 2 in accordance with, for example, the method for producing the catalyst layer disclosed in Patent Literature 1. In this case, in order to make the porous structure or void layers in the catalyst layer, it is necessary to remove the pore-forming material. This step of removal can be performed by washing using an acid solution, washing using an alkaline solution, an electrolytic method, or the like. In a case where a washing using an acid solution is performed, for example, the stacked structure as shown in FIG. 3 B is immersed in a nitric acid, a hydrochloric acid, a sulfuric acid, or any given mixed liquid thereof for about five minutes to 50 hours, and the pore-forming material is solved and is caused to flow out. At this occasion, it may be heated to a temperature equal to or more than about 50 degrees Celsius and equal to or less than 100 degrees Celsius.

In the above step of removal, in order to suppress the outflow of the noble metal having catalyst activation property, a processing may be performed to fix the noble metal having the catalyst activation property to the porous water management layer. For example, before the removal of pore-forming materials, the structure as shown in FIG. 2 can be impregnated with a polymer solution having an adhesive property. In particular, it is preferable to use a polymer solution such as ionomer having a proton conduction property.

Further, after the step of removal, thermal treatment may be performed as post processing in order to improve the durability of the catalyst having a noble metal catalyst unit that has a porous structure or a layer-by-layer structure including void layers. In a case where the thermal treatment is performed, there is an effect in that the crystallization of the catalyst is accelerated, and the structure of the catalyst is stabilized to improve the durability. The temperature of the thermal treatment can be, for example, equal to or more than 300 degrees Celsius and equal to or less than 600 degrees Celsius. When the thermal treatment is performed at a temperature higher than 600 degrees Celsius, this increases the chance that the catalyst peels off from the porous water management layer. The period of time for which the thermal treatment is performed may be, for example, equal to or more than 30 minutes and equal to or less than two hours. The thermal treatment can be performed under an inert gas atmosphere such as argon or foam gas (a mixed gas of hydrogen and nitrogen) atmosphere. It is preferable to suppress formation of oxides as much as possible.

In the step of giving hydrophilic property according to the embodiment, a hydrophilic polymer is introduced to the structure including the catalyst layer 1 having a noble metal catalyst unit 22 that has a porous structure or a layer-by-layer structure including void layers, the porous water management layer 2, and the substrate 5 as shown in FIG. 3 B, so that the hydrophilic property is given thereto. The method of introducing the hydrophilic polymer may use an impregnating method for putting the structure as shown in FIG. 3 B into the dispersion solution of the hydrophilic polymer, a method of spraying the dispersion solution, and the like.

The step of giving hydrophilic property by introducing the water-repellent agent to the gas diffusion layer may use a dipping method for impregnating the gas diffusion layer base material in a dispersion solution in which polymer fine particles having water-repellent are dispersed, a spraying method for spraying a dispersion solution, and the like, but the step of giving hydrophilic property by introducing the water-repellent agent to the gas diffusion layer preferably uses a dipping method in which the amount of introduced solution is highly uniform in the surface dimension and the thickness dimension.

Figure 3A:
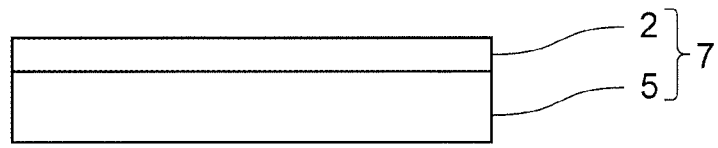
FIG. 3A, 3B, 3C, 3D, 3E is a cross sectional view in the order of steps schematically illustrating a method for producing an electrode according to the first embodiment of the embodiment.
Figure 3B:
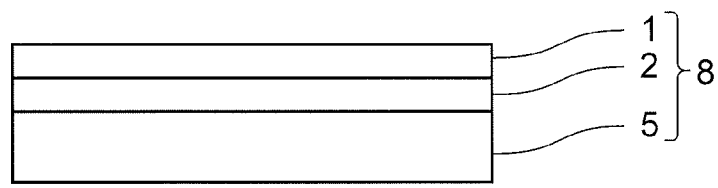
Figure 3C:
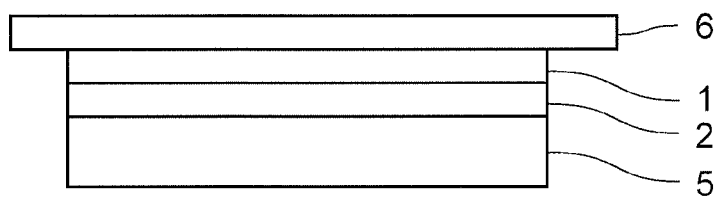

Subsequently, in the step of forming the electrode which is the embodiment of the embodiment, as shown in FIG. 3C, the stacked structure 8 is transferred onto the polymer electrolyte membrane 6 having the proton conduction property.

Figure 3D:
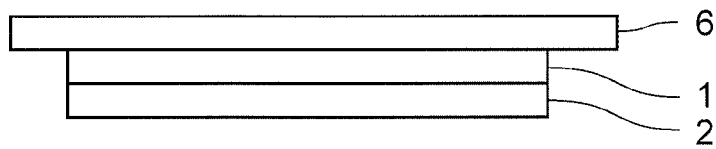
Figure 3E:
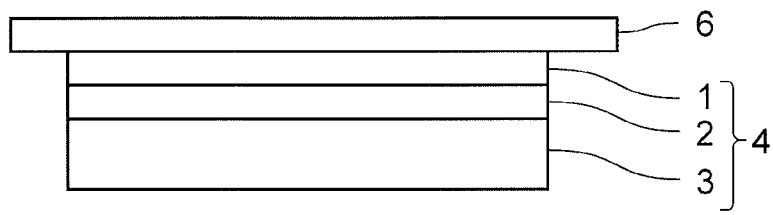

Thereafter, as shown in FIG. 3D, the substrate 5 is peeled off from the porous water management layer 2. Therefore, the catalyst layer 1 having a noble metal catalyst unit 22 that has a porous structure or a layer-by-layer structure including void layers and the porous water management layer 2 can be transferred to the polymer electrolyte membrane 6. This transfer is performed by using, for example, an apparatus capable of applying heat and pressure. For example, this can be done by using a hot press apparatus or a roll-to-roll method. At this occasion, the press temperature may be equal to or more than the glass transition temperature of the polymer electrolyte membrane used as the bonding agent between the catalyst and the electrolyte membrane, and, for example, the press temperature may be equal to or more than 100 degrees Celsius and equal to or less than 400 degrees Celsius. The press pressure depends on the hardness of the used catalyst and the polymer electrolyte membrane 6, but, for example, the press pressure may be equal to or more than 5 kg/cm$^2$ and equal to or less than 200 kg/cm$^2$.

The step of giving the hydrophilic property may be performed after the catalyst layer 1 having a noble metal catalyst unit 22 that has a porous structure or a layer-by-layer structure including void layers and the porous water management layer 2 are transferred to the polymer electrolyte membrane 6. In this case, after the substrate 5 is peeled off but before the gas diffusion layer 3 is attached, a hydrophilic polymer dispersion solution can be sprayed onto the surface of the entire stacked structure (FIG. 3 E).

The catalyst layer 1 having a noble metal catalyst unit 22 that has a porous structure or a layer-by-layer structure including void layers having the hydrophilic property according to the embodiment, the porous water management layer 2, and the membrane electrode assembly 4 having the gas diffusion layer 3. The generated water formed in the catalyst layer 1 is absorbed into the porous water management layer, and is efficiently discharged, thus avoiding flooding generated by formation of a water film at the interface between the catalyst layer 1 and the porous water management layer 2, and maintaining an appropriate relative humidity. As a result, a high degree of robustness can be realized.

Second Embodiment

Subsequently, a membrane electrode assembly (MEA) according to the second embodiment of the embodiment will be explained.

Figure 4:
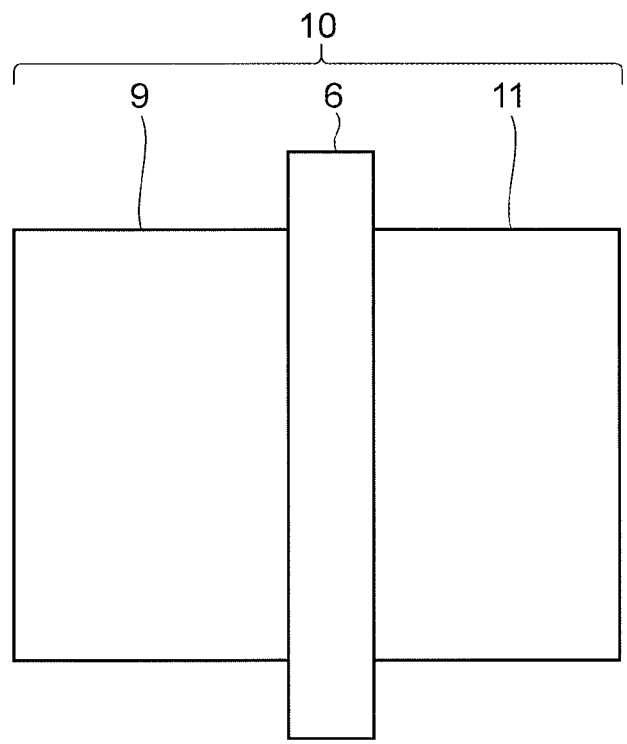
FIG. 4 is a cross sectional view schematically illustrating a part of a fuel cell according to a third embodiment of an embodiment.

FIG. 4 is a cross sectional view schematically illustrating the MEA having the membrane electrode assembly 4 of the first embodiment as the anode. The MEA according to the embodiment has a basic configuration including a first electrode and a second electrode at least one of which includes an electrode according to the first embodiment and an electrolyte serving as a separator interposed between the first and second electrodes.

An MEA 10 appropriate for this fuel cell has a basic configuration arranged with the polymer electrolyte membrane 6 having the proton conduction property serving as the electrolyte and the first and second electrodes with the polymer electrolyte membrane 6 interposed therebetween, i.e., a fuel electrode (anode) 9 serving as the first electrode to which hydrogen is supplied and the air electrode (cathode) 11 serving as the second electrode to which oxygen is supplied. As explained in the first embodiment, the anode 9 is constituted by the membrane electrode assembly 4 including the gas diffusion layer 3. The cathode 11 is constituted by a diffusion layer and a cathode catalyst layer, not shown. The anode 9 and the cathode 11 are stacked so that the polymer electrolyte membrane 6 is interposed therebetween, and the catalyst layers of the anode 9 and the cathode 11 are configured to face each other. Both the anode catalyst layer (catalyst layer 1) and the cathode catalyst layer (catalyst layer 1) or at least the cathode is provided with the electrode according to the first embodiment of the embodiment.

The proton conductive substance included in the polymer electrolyte membrane 6 of the membrane electrode assembly 10 may be made of any material without any particular limitation as long as it is a material that can conduct protons. Examples of proton conduction property substances include fluorine resins having sulfonic acid groups such as Nafion™ (made by Du Pont, trade name), Flemion™ (made by Asahi Kasei Corporation, trade name), Aciplex™ (Asahi Glass Co., Ltd., trade name), and the like, and inorganic materials such as tungsten acid and phosphotungstic acid, but the proton conduction property substance is not limited thereto. The thickness of the polymer electrolyte membrane 6 may be determined as necessary in view of the characteristics of the obtained membrane electrode assembly 10, but preferably, the polymer electrolyte membrane 6 having a thickness equal to or more than 5 μm and equal to or less than 300 μm is used, and more preferably, the polymer electrolyte membrane 6 having a thickness equal to or more than 5 μm and equal to or less than 150 μm is used. In particular, from the view point of strength during deposition and endurance property during operation of the membrane electrode assembly 10, the thickness of the polymer electrolyte membrane 6 is preferably equal to or more than 5 μm, and from the view point of output characteristics during operation of the membrane electrode assembly 10, the thickness of the polymer electrolyte membrane 6 is preferably equal to or less than 300 μm.

The bonding of the polymer electrolyte membrane 6 and the anode and the cathode is performed by using an apparatus capable of applying heat and pressure. For example, this can be done by using a hot press apparatus. At this occasion, the press temperature may be equal to or more than the glass transition temperature of the polymer electrolyte membrane used as the bonding agent between the electrode and the electrolyte membrane, and, for example, the press temperature may be equal to or more than 100 degrees Celsius and equal to or less than 400 degrees Celsius. The press pressure depends on the hardness of the used catalyst and the polymer electrolyte membrane 6, but, for example, the press pressure may be equal to or more than 5 kg/cm$^2$ and equal to or less than 200 kg/cm$^2$.

Third Embodiment

Figure 5:
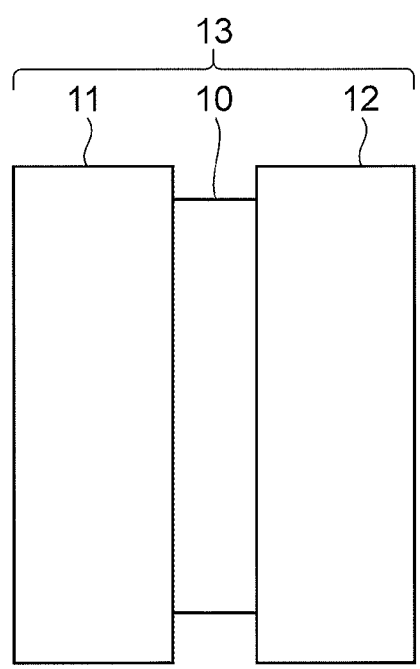
FIG. 5 is a cross sectional view schematically illustrating a part of a fuel cell according to the third embodiment of the embodiment.

Subsequently, a fuel cell, the third embodiment of the embodiment will be explained. FIG. 5 schematically illustrates an example of a fuel cell 13 according to the embodiment.

The fuel cell 13 according to the embodiment includes the membrane electrode assembly 10 according to the second embodiment, means for providing fuel to the anode, and means for providing oxidizing agent to the cathode. The fuel cell 13 according to the embodiment may include not only the membrane electrode assembly 10 but also a fuel cell flow field plate, and further, may include a porous fuel diffusion layer between this membrane electrode assembly 10 and the fuel cell flow field plate. More specifically, an electric cell is constituted by incorporating the membrane electrode assembly 10 into the inside of an anode separator 11 attached with a fuel supply flow field, which serves as a first electrode for supplying hydrogen and the like, which is fuel, to the anode, and the cathode separator 12 attached with an oxidizing agent gas supply flow field, which serves as a second electrode for supplying air (oxygen) to the cathode from a supply system for supplying an oxidizing agent such as air (oxygen), so that the fuel cell 13 generates electric power. A single membrane electrode assembly 10 may be used, or multiple membrane electrode assemblies 10 may be used. When multiple membrane electrode assemblies 10 are used, a higher electromotive force can be obtained. In general, a stacked structure obtained by stacking multiple membrane electrode assemblies 10 with the anode separator 11 and the cathode separator 12 interposed therebetween and connecting them in series may be provided and used. The shape of the fuel cell stack is not particularly limited, and may be determined as necessary so as to obtain desired fuel cell characteristics such as cell voltage.

EXAMPLES

Hereinafter, a method for producing an electrode, a membrane electrode assembly, and a fuel cell according to the embodiment of the embodiment will be explained on the basis of specific examples. It should be noted that the examples explained below are examples of the typical embodiment of the embodiment, and the embodiment is not limited to the examples shown below.

First Example

<Production of Electrode According to First Embodiment>

First, a carbon paste for applying the porous water management layer 2 was made. 0.2 g of carbon black of which average particle diameter is 30 nm was mixed in a 4 g of solvent, and dispersed by ultrasonic dispersion for ten minutes, and thereafter, agitated for 30 minutes. 0.1 g of glycerin was added to this mixture, and further, dispersed by ultrasonic dispersion for 30 minutes, and thereafter, agitated for two hours. As a result, the carbon paste was obtained.

Subsequently, a Kapton™ film which is a transfer substrate and of which thickness is 25 μm was prepared. The carbon paste was applied thereto with an air spray until the thickness attained 5 μm. The applied carbon paste was dried at 180 degrees Celsius for two hours with a hot plate or an oven, so that a porous structure was formed. The porosity of the porous structure was about 35 vol %.

Subsequently, by using the porous structure after drying as the substrate, sputtering of Pt and sputtering of Co, Ni were applied, so that Pt having the catalyst activation and the pore-forming material were formed so that the loading amount of Pt attained 0.2 mg/cm$^2$. As described above, the catalyst was stacked and formed on the porous structure.

Thereafter, in order to remove the pore-forming material, acid treatment was performed. Through cleaning with pure water and drying, the catalyst having a noble metal catalyst unit that has a porous structure or a layer-by-layer structure including void layers was obtained.

Thereafter, by using dispersion liquid of ionomer of Nafion™ of 0.1 wt % (made by Du Pont), the aforementioned stacked structure having a noble metal catalyst unit 22 that has a porous structure or a layer-by-layer structure including void layers and the porous water management layer was made into hydrophilic with air spray. The ionomer was sprayed until the hydrophilicity attained 0.4.

By using Nafion™ 211 (made by Du Pont, trade name) serving as the electrolyte membrane, the hydrophilic structure (5 cm×5 cm) and the electrolyte membrane were arranged at the cathode side. Thereafter, by performing hot press in which the hydrophilic structure and the electrolyte membrane were heated to 150 degrees Celsius and held for five minutes under a pressurized pressure of 40 kgf/cm$^2$, the assembly including the electrolyte membrane, the hydrophilic structure at the cathode side, and the Kapton™ substrate was obtained. Subsequently, the Kapton™ film was cooled and peeled off from the assembly. Thereafter, carbon paper of SGL™ 25BA (made by SGL, trade name) of which degree of water-repellency is 5%, as the gas diffusion layer, onto the porous water management layer, and the electrode of the first embodiment was obtained as the cathode.

<Production of gas diffusion electrode of carbon-supported Pt catalyst> 2 g of carbon-supported Pt catalyst (made by TANAKA KINZOKU KOGYO K.K.), 5 g of pure water, 5 g of 20% Nafion™ solution and 20 g of 2-ethoxyethanol were agitated well and dispersed, and thereafter, slurry was made. The obtained slurry was applied to SGL 25BC (with water-repellent MPL, made by SGL) with spray, and was dried. As a result, the anode gas diffusion electrode of which loading density of Pt catalyst is 0.2 mg/cm$^2$ was made.

<Production of Single Cell of MEA and Fuel Cell>

The electrode according to the first embodiment of the embodiment was used as the cathode. The anode uses the electrode of carbon-supported Pt catalyst explained above.

Nafion™ 211 (trade name, made by Du Pont) serving as the electrolyte membrane was sandwiched by the cathode and the anode, and bonded by thermocompression at a temperature of 150 degrees Celsius with a pressure of 20 kg/cm$^2$ for two minutes, so that the MEA was obtained.

The MEA thus obtained was sandwiched by the first separator and second separator each including the flow field, so that a single cell of a polymer electrolyte-type fuel cell serving as an electrochemical cell was obtained.

<Electric Generation Characteristics Evaluation>

Subsequently, the single cell was installed on an evaluation apparatus equipped with an electronic load apparatus, and thereafter, a cell temperature was 80 degrees Celsius, and a fuel (hydrogen, utilization ratio 70%, 100% RH) was supplied to the anode side. An oxidizing agent (air, utilization ratio 40%, 66% RH) was supplied to the cathode side. Subsequently, the electronic load apparatus was set to the low current mode, and the potential of the single cell including the MEA was held at A/cm$^2$ for 24 hours, and conditioning was performed. After the conditioning, the cell temperature was set to 80 degrees Celsius, and a fuel (hydrogen, utilization ratio 70%, 100% RH) was supplied to the anode side, and an oxidizing agent (air, utilization ratio 40%, 66% RH, 100% RH) was supplied to the cathode side, and a cell voltage under a condition that the humidity at the cathode side where I-V measurement was evaluated was 100% RH (full humidification) and current densities of 0.2 A/cm$^2$ and 1 A/cm$^2$ were operated, and a voltage reduction obtained by comparing this voltage and a voltage under the 66% RH condition were evaluated. Among these electric generation situations, the condition in which a current density of 1 A/cm$^2$ is operated is most likely to cause flooding. The cell voltage under this condition and the voltage reduction obtained by comparing and this voltage and the voltage under the 66% RH condition was adopted as the standard of the evaluation of the embodiment effect.

When the humidity of the inlet gas at the cathode side is RH66% and the current density was 0.2 A/cm$^2$, the cell voltage of the fuel cell was 0.751 V, and at current density of 1 A/cm$^2$, the cell voltage of the fuel cell was 0.540 V. When the gas at the cathode side was fully humidified and the current density was 0.2 A/cm$^2$, the cell voltage of the fuel cell was 0.744 V, and at current density of 1 A/cm$^2$, the cell voltage of the fuel cell was 0.517 V. A preferable high humidity robustness was achieved.

Second Example

The porosity of the porous water management layer in the electrode of the cathode was configured to be 62 vol %. Except this, the conditions are the same as those of the first example.

When the humidity of the inlet gas at the cathode and the current density was 0.2 A/cm$^2$, the cell voltage of the fuel cell was 0.765 V, when the current density was 1 A/cm$^2$, the cell voltage of the fuel cell was 0.571 V. When the gas at cathode side was fully humidified and the current density was 0.2 A/cm$^2$, the cell voltage of the fuel cell was 0.755 V, and when the current density was 1 A/cm$^2$, the cell voltage of the fuel cell was 0.564 V. A preferable high humidity robustness was achieved.

Third Example

The hydrophilicity of the porous water management layer in the electrode of the cathode was configured to be 0.06. Except this, the conditions are the same as those of the second example.

When the humidity of the inlet gas at the cathode side was RH66% and the current density was 0.2 A/cm$^2$, the cell voltage of the fuel cell was 0.758 V, and when the current density was 1 A/cm$^2$, the cell voltage of the fuel cell was 0.562 V. When the gas at the cathode side was fully humidified and the current density was 0.2 A/cm$^2$, the cell voltage of the fuel cell was 0.745 V, and when the current density was 1 A/cm$^2$, the cell voltage of the fuel cell was 0.524 V. A preferable high humidity robustness was achieved.

Fourth Example

The hydrophilicity of the porous water management layer in the electrode of the cathode was configured to be 0.9. Except this, the conditions are the same as those of the second example.

When the humidity of the inlet gas at the cathode side was RH66% and the current density was 0.2 A/cm$^2$, the cell voltage of the fuel cell was 0.741 V, and when the current density was 1 A/cm$^2$, the cell voltage of the fuel cell was 0.557 V. When the inlet gas at the cathode side was fully humidified and the current density was 0.2 A/cm$^2$, the cell voltage of the fuel cell was 0.737 V, and when the current density was 1 A/cm$^2$, the cell voltage of the fuel cell was 0.548 V. A preferable high humidity robustness was achieved.

Fifth Example

The porosity of the porous water management layer in the electrode of the cathode was configured to be 81 vol %. Except this, the conditions are the same as those of the first example.

When the humidity of the inlet gas at the cathode side was RH66% and the current density was 0.2 A/cm$^2$, the cell voltage of the fuel cell was 0.761 V, and when the current density was 1 A/cm$^2$, the cell voltage of the fuel cell was 0.565 V. When the inlet gas at the cathode side was fully humidified and the current density was 0.2 A/cm$^2$, the cell voltage of the fuel cell was 0.752 V, and when the current density was 1 A/cm$^2$, the cell voltage of the fuel cell was 0.531 V. A preferable high humidity robustness was achieved.

Sixth Example

The thickness of the porous water management layer in the electrode of the cathode was configured to be 3 μm. Except this, the conditions are the same as those of the second example.

When the humidity of the inlet gas at the cathode side was RH66% and the current density was 0.2 A/cm$^2$, the cell voltage of the fuel cell was 0.766 V, and when the current density was 1 A/cm², the cell voltage of the fuel cell was 0.557 V. When the inlet gas at the cathode side was fully humidified and the current density was 0.2 A/cm², the cell voltage of the fuel cell was 0.754 V, and when the current density was 1 A/cm², the cell voltage of the fuel cell was 0.541 V. A preferable high humidity robustness was achieved.

Seventh Example

The thickness of the porous water management layer in the electrode of the cathode was configured to 10 µm. Except this, the conditions are the same as those of the second example.

When the humidity of the inlet gas at the cathode side was RH66% and the current density was 0.2 A/cm², the cell voltage of the fuel cell was 0.757 V, and when the current density was 1 A/cm², the cell voltage of the fuel cell was 0.547 V. When the inlet gas at the cathode side was fully humidified and the current density was 0.2 A/cm², the cell voltage of the fuel cell was 0.744 V, and when the current density was 1 A/cm², the cell voltage of the fuel cell was 0.516 V. A preferable high humidity robustness was achieved.

First Comparative Example

The porosity and the hydrophilicity of the porous water management layer in the electrode of the cathode were configured to be 90 vol % and 0.03. Except this, the conditions are the same as those of the first example.

When the humidity of the inlet gas at the cathode side was RH66% and the current density was 0.2 A/cm², the cell voltage of the fuel cell was 0.756 V, and when the current density was 1 A/cm², the cell voltage of the fuel cell was 0.544 V. When the inlet gas at the cathode side was fully humidified and the current density was 0.2 A/cm², the cell voltage of the fuel cell was 0.684 V, and when the current density was 1 A/cm², flooding occurred in the cell voltage of the fuel cell, and therefore, the measurement could not be performed. A significant performance reduction was observed because of a high humidity operating environment of the fuel cell.

Second Comparative Example

The porosity and the hydrophilicity of the porous water management layer in the electrode of the cathode were configured to be 90 vol % and 1.2. Except this, the conditions are the same as those of the first example.

When the humidity of the inlet gas at the cathode side was RH66% and the current density was 0.2 A/cm², the cell voltage of the fuel cell was 0.746 V, and when the current density was 1 A/cm², the cell voltage of the fuel cell was 0.541 V. When the inlet gas at the cathode side was fully humidified and the current density was 0.2 A/cm², the cell voltage of the fuel cell was 0.721 V, and when the current density was 1 A/cm², the cell voltage of the fuel cell was 0.478 V. The voltage of the cell under full humidification was better than the first comparative example, but a significant performance reduction was observed because of a high humidity operating environment of the fuel cell.

Figure 6:
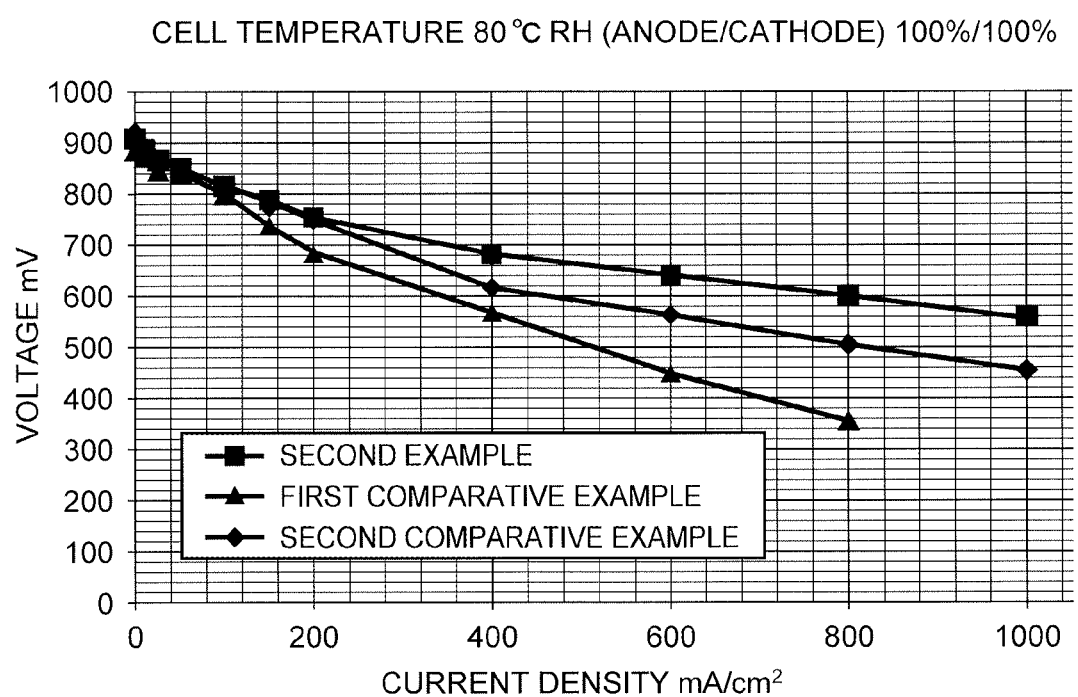
FIG. 6 is a figure illustrating characteristics of power generation characteristics of an MEA according to a first example, a first comparative example, and a second comparative example.

Output characteristics of the fuel cell (voltage-current density characteristics) according to the second example, the first comparative example, and the second comparative example are shown in FIG. 6. As can be understood from the result of FIG. 6, when the current density becomes larger, the voltage drop of the comparative examples becomes more significant under the full humidification condition than that of the second example. In particular, in the case of the first comparative example in which the hydrophilicity of the porous water management layer is low, little hydrophilic ionomer is applied to the porous water management layer and the catalyst layer having a noble metal catalyst unit that has a porous structure or a layer-by-layer structure including void layers, and the generated water is difficult to be discharged, and the voltage drop became more significant under a high humidity operating environment. In the second comparative example, the hydrophilicity of the porous water management layer is 1.2, and much hydrophilic ionomer is applied to the porous water management layer and the catalyst layer, and the diffusion resistance of the oxidizing agent increases, and in a case where the amount of introduced hydrophilic ionomer is too much, the water also becomes more difficult to be discharged. In particular, the cell voltage difference between the second example and the second comparative example becomes significant when the current density increases to 0.4 A/cm². When the current density becomes larger, the amount of the generated water also increases. Therefore, in these comparative examples, flooding is likely to occur at high current density regions under a full humidification condition. In contrast, in the fuel cell according to the second example, because of the existence of the porous water management layer of which porosity is 62 vol % and of which hydrophilicity is 0.04, the generated water at the catalyst layer can be smoothly discharged to the porous water management layer. And also when the fuel cell operates at a high electric current, the flow rate of the gas also increases, and the water at the porous water management layer can be discharged by the gas flow, and therefore, the flooding is considered to be prevented.

The cell voltage fluctuation evaluation results of the above examples and the above comparative examples are shown in Table 1. In this Table 1, in a case where the humidity of anode/cathode were changed from 100%/66% to 100%/100%, an evaluation A was obtained when a voltage fluctuation under the current density of 0.2 or 1.0 A/cm² was equal to or less than 0.02 V, an evaluation B was obtained when the voltage fluctuation was more than 0.02 V and less than 0.04 V, and an evaluation C was obtained when the voltage fluctuation was equal to or more than 0.04 V.

TABLE 1

| EVALUATION PARAMETER | FIRST EXAMPLE | SECOND EXAMPLE | THIRD EXAMPLE | FOURTH EXAMPLE | FIFTH EXAMPLE | SIXTH EXAMPLE | SEVENTH EXAMPLE | FIRST COMPARATIVE EXAMPLE | SECOND COMPARATIVE EXAMPLE |
|---|---|---|---|---|---|---|---|---|---|
| POROSITY (vol %) | 35 | 62 | 62 | 62 | 81 | 62 | 62 | 90 | 90 |

TABLE 1-continued

| EVALUATION PARAMETER | FIRST EXAMPLE | SECOND EXAMPLE | THIRD EXAMPLE | FOURTH EXAMPLE | FIFTH EXAMPLE | SIXTH EXAMPLE | SEVENTH EXAMPLE | FIRST COMPARATIVE EXAMPLE | SECOND COMPARATIVE EXAMPLE |
|---|---|---|---|---|---|---|---|---|---|
| HYDROPHILICITY | 0.4 | 0.4 | 0.07 | 0.9 | 0.4 | 0.4 | 0.4 | 0.03 | 1.2 |
| THICKNESS OF POROUS WATER CONTENT MANAGEMENT LAYER (μm) | 5 | 5 | 5 | 5 | 5 | 3 | 10 | 5 | 5 |
| VOLTAGE FLUCTUATION WHEN CURRENT DENSITY IS 0.2 A/cm$^2$ | A | A | A | A | A | A | A | C | B |
| VOLTAGE FLUCTUATION WHEN CURRENT DENSITY IS 1 A/cm$^2$ | B | A | B | A | B | A | B | C | C |

As can be seen from these results, the evaluation A or B which is acceptable for practical use can be obtained as long as the cell was made under the condition that the porosity is equal to or more than 30 vol % and equal to or less than 85 vol % and the hydrophilicity thereof is equal to or more than 0.05 and equal to or less than 1. With the cell according to the comparative example which is out of the above ranges, the evaluation C which is not suitable for practical use was obtained. More specifically, with the single cell made according to the examples, the anti-flooding property is high even when the humidity of the inlet gas at the cathode side is 100%, and in particular, it was proved that, when the cell operated at a high electric current density of 1 A/cm2, a high cell voltage can be maintained, and the decrease in the power generation property is small, and more specifically, the water discharge performance and the gas diffusion performance are excellent for these examples under the high humidity condition when the fuel cell operated at a high current density, which leads to the excellent power generation property of the cell.

What is claimed is:

1. An electrode for a fuel cell comprising:
    a catalyst layer having a hydrophilic material and a noble metal catalyst unit that has a porous structure or a layer-by-layer structure including void layers;
    a porous water management layer arranged adjacent to the catalyst layer and including the hydrophilic material and a conductive material; and
    a gas diffusion layer arranged adjacent to the porous water management layer,
    wherein a size of the noble metal catalyst unit is equal to or more than 0.05 μm and equal to or less than 2 μm, the porosity of the porous water management layer is equal to or more than 30 vol % and equal to or less than 85 vol %, and the hydrophilicity of the porous water management layer is equal to or more than 0.05 and equal to or less than 0.4.

2. The electrode for the fuel cell according to claim 1, wherein a thickness of the porous water management layer is equal to or more than 1 μm and equal to or less than 10 μm.

3. The electrode for the fuel cell according to claim 1, wherein the hydrophilic material of the catalyst layer is a hydrophilic polymer.

4. The electrode for the fuel cell according to claim 3, wherein the hydrophilic polymer is an ionomer having ion conduction property.

5. A membrane electrode assembly for a fuel cell comprising:
    a first electrode capable of operating as an anode;
    a separator arranged adjacent to the first electrode; and
    a second electrode arranged adjacent to the separator and capable of operating as a cathode,
    wherein at least one of the first and second electrodes includes:
    a catalyst layer having a hydrophilic material and a noble metal catalyst unit that has a porous structure or a layer-by-layer structure including void layers, the noble metal catalyst unit having a size which is equal to or more than 0.05 μm and equal to or less than 2 μm;
    a porous water management layer arranged adjacent to the catalyst layer and including the hydrophilic material and a conductive material, wherein the porosity of the porous water management layer is equal to or more than 30 vol % and equal to or less than 85 vol %, and the hydrophilicity of the porous water management layer is equal to or more than 0.05 and equal to or less than 0.4; and
    a gas diffusion layer arranged adjacent to the porous water management layer.

6. The membrane electrode assembly for the fuel cell according to claim 5, wherein a thickness of the porous water management layer is equal to or more than 1 μm and equal to or less than 10 μm.

7. The membrane electrode assembly for the fuel cell according to claim 5, wherein the hydrophilic material is a hydrophilic polymer.

8. The membrane electrode assembly for the fuel cell according to claim 7, wherein the hydrophilic polymer is an ionomer having ion conduction property.

9. A fuel cell comprising:
    a first electrode capable of operating as an anode;
    a fuel supply flow field in which fuel is supplied to the first electrode;
    an anode separator arranged adjacent to the first electrode;
    a second electrode arranged adjacent to a cathode separator and capable of operating as a cathode; and
    an oxidizing agent gas supply flow field in which oxidizing agent is supplied to the second electrode, wherein at least one of the first and second electrodes includes:

a catalyst layer having a hydrophilic material and a noble metal catalyst unit that has a porous structure or a layer-by-layer structure including void layers, the noble metal catalyst unit having a size which is equal to or more than 0.05 µm and equal to or less than 2 µm;

a porous water management layer arranged adjacent to the catalyst layer and including the hydrophilic material and a conductive material, wherein the porosity of the porous water management layer is equal to or more than 30 vol % and equal to or less than 85 vol %, and the hydrophilicity of the porous water management layer is equal to or more than 0.05 and equal to or less than 0.4; and a gas diffusion layer arranged adjacent to the porous water management layer.

10. The fuel cell according to claim 9, wherein a thickness of the porous water management layer is equal to or more than 1 µm and equal to or less than 10 µm.

11. The fuel cell according to claim 9, wherein the hydrophilic material is a hydrophilic polymer.

12. The fuel cell according to claim 11, wherein the hydrophilic polymer is an ionomer having ion conduction property.

13. An electrode for a fuel cell comprising:

a catalyst layer having a hydrophilic material and a noble metal catalyst unit that has a porous structure or a layer-by-layer structure including void layers;

a porous water management layer arranged adjacent to the catalyst layer and including the hydrophilic material and a conductive material; and a gas diffusion layer arranged adjacent to the porous water management layer, wherein a size of the noble metal catalyst unit is equal to or more than 0.05 µm and equal to or less than 2 µm, the porosity of the porous water management layer is equal to or more than 30 vol % and equal to or less than 85 vol %, and the hydrophilicity thereof is equal to or more than 0.05 and equal to or less than 0.4, and wherein an overall average thickness of the catalyst layer is 0.05 µm to 3 µm.

14. The electrode for the fuel cell according to claim 13, wherein a thickness of the porous water management layer is equal to or more than 1 µm and equal to or less than 10 µm.

15. The electrode for the fuel cell according to claim 13, wherein the hydrophilic material of the catalyst layer is a hydrophilic polymer.

16. The electrode for the fuel cell according to claim 15, wherein the hydrophilic polymer is an ionomer having ion conduction property.

17. A fuel cell comprising:

a first electrode capable of operating as an anode;

a second electrode capable of operating as a cathode;

a separator disposed adjacent between the first electrode and the second electrode, and in which there is a fuel supply flow field adjacent to the first electrode; and an oxidant gas supply flow field adjacent to the second electrode;

wherein at least one of the first and second electrodes includes:

a catalyst layer having a hydrophilic material and a noble metal catalyst unit that has a porous structure or a layer-by-layer structure including void layers, the noble metal catalyst unit having a size which is equal to or more than 0.05 µm and equal to or less than 2 µm;

a porous water management layer arranged adjacent to the catalyst layer and including the hydrophilic material and a conductive material, wherein the porosity of the porous water management layer is equal to or more than 30 vol % and equal to or less than 85 vol %, and the hydrophilicity of the porous water management layer is equal to or more than 0.05 and equal to or less than 0.4; and a gas diffusion layer arranged adjacent to the porous water management layer.

18. The fuel cell according to claim 17, wherein a thickness of the porous water management layer is equal to or more than 1 µm and equal to or less than 10 µm.

19. The fuel cell according to claim 17, wherein the hydrophilic material is a hydrophilic polymer.

20. The fuel cell according to claim 19, wherein the hydrophilic polymer is an ionomer having ion conduction property.

21. The electrode for the fuel cell according to claim 1, wherein the noble metal catalyst unit precludes the carbon-based electrically conductive carrier.

22. The electrode for the fuel cell according to claim 1, wherein an overall average thickness of the catalyst layer is 0.05 µm to 3 µm.

* * * * *